United States Patent

[11] 3,612,235

[72] Inventors: Karl Ashauer; Dieter Manthey, both of Wolfsburg, Germany
[21] Appl. No.: 883,398
[22] Filed: Dec. 9, 1969
[45] Patented: Oct. 12, 1971
[73] Assignee: VOLKSWAGENWERK Aktiengesellschaft Wolfsburg, Germany
[32] Priority: Dec. 10, 1968
[33] Germany
[31] P 18 13 621.5

[54] SLIDE SLEEVE FOR GEAR SHIFTING AND SYNCHRONIZATION OF POWER VEHICLES
1 Claim, 5 Drawing Figs.

[52] U.S. Cl. .................................................. 192/53 F, 192/109 R
[51] Int. Cl. .................................................. F16d 23/06
[50] Field of Search .................................................. 192/53, 109 R, 114

[56] References Cited
UNITED STATES PATENTS
3,270,843  9/1966  Ivanchich ..................... 192/53 F
FOREIGN PATENTS
1,148,834  5/1963  Germany ..................... 192/53 G Primary Examiner—Allan D. Herrmann
Attorney—Watson, Cole, Grindle & Watson

ABSTRACT: A sliding sleeve for the gear shift and synchronizing devices of motor vehicles having a clutch gear with coupling teeth and a ring-shaped spring to encircle the teeth of the clutch gear.

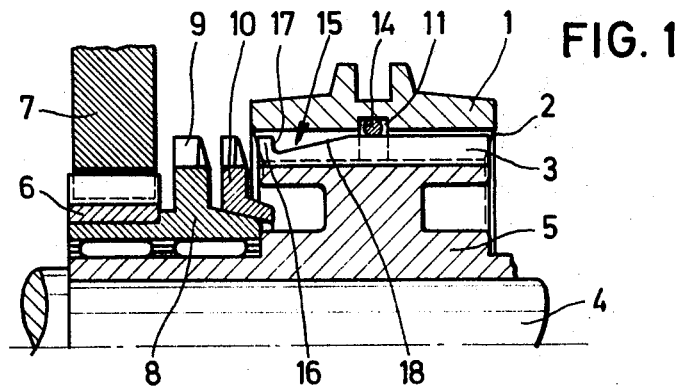
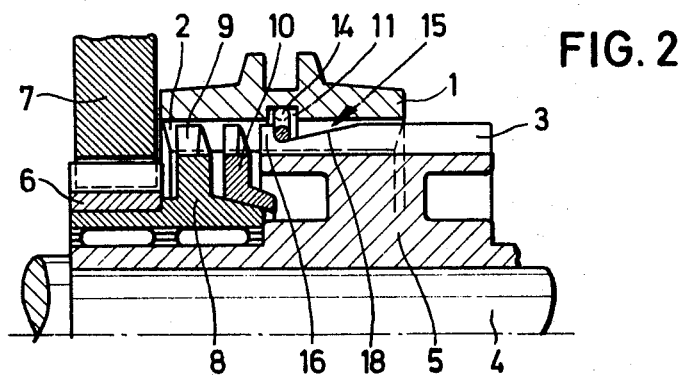
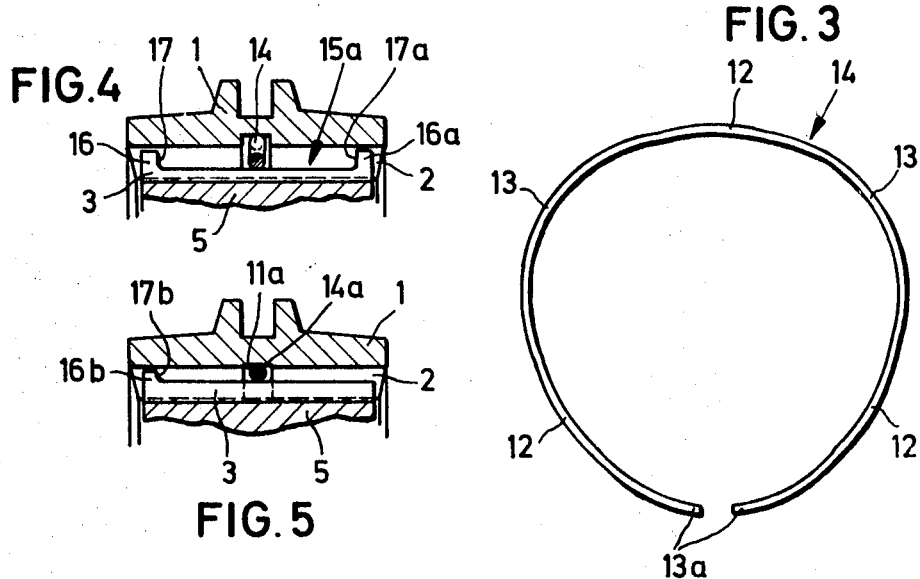
INVENTORS
K. Ashauer
D. Manthey
BY Watson, Cole, Grindle & Watson
Att'ys.

SLIDE SLEEVE FOR GEAR SHIFTING AND SYNCHRONIZATION OF POWER VEHICLES

This invention relates to a sliding sleeve for gear shift and synchronization installations of motor vehicles, which engage with an inside toothing or teeth into an outside toothing or teeth of a sleeve support arranged fixed on a shaft and which penetrates into the coupling teeth of the gear that is to be coupled when a particular speed is supposed to be fixed.

It is an object of the invention to provide an installation in which the gear that is to be coupled is smaller than the diameter of the addendum circle of the inside teeth of the sliding sleeve. Then the shifting path of the sliding sleeve must be limited by a special stop, so that the sliding sleeve will not run into the mating gear of the speed shifted thereinto. For this purpose stop disks have been known which are placed between the part carrying the coupling teeth and the pertinent gear, and to be sure either prior to the connection of these two parts or else subsequently when the parts are already united with one another or whenever they consist of one piece. In the first case, when the connection is to be accomplished by welding, the stop disk must be made of high-quality raw material so that it can withstand the heat treatment during welding. In the other case, it must have inside teeth so that it can be pushed through the gear and can be centered on the other side.

Although such solutions are relatively expensive, they are used preferably in the case of constructions which make possible a switch over of the sliding sleeve. In the case of switching over which is favorable from the point of view of its function and which has already proven itself in practice, the ends of the teeth of the sliding sleeve that have been beveled on both sides in the shifting direction which ends of the teeth play a role in the case of synchronization, will shift beyond the coupling teeth of the gear that is to be coupled so that the coupling teeth in the case of the shifted speed will come to bear with the full width of their teeth. In order to keep the distance of the shaft bearings small, the sliding sleeve here must be disposed particularly close to the mating gear.

It is a further object of the invention to being about the limiting of the shifting path of a sliding sleeve of the type described initially, by simple and inexpensive means and to arrange the elements provided for this purpose within the revolving parts to bring about the synchronization and shifting of speeds.

For a solution of this object, the invention proposes a circular spring encompassing the teeth of the sleeve support which is fixed in an annular groove cutting the teeth of the sliding sleeve and in the case of a shifted speed, fits against the ends of the teeth of the slide support projecting radially in relation to the spring. The advantage of the invention consists in that the utilization of material and the development of the part, in this case the spring, bringing about the stop of the sliding sleeve, is favorable in comparison to the part of the customary designs especially if the diameter of the coupling teeth is considerably larger than the assigned or pertinent gear. The arrangement of the spring furthermore leaves a minimum of a slit between the sliding sleeves and the mating gear of the shifted speed. As a result thereof, a favorable distance of the bearings for the shaft of the gear unit will result.

Advantageously, the spring can consist of wire and may have three radial bulges or the like distributed evenly on the periphery whereby one bulge is arranged symmetrically in relation to the ends of the spring and the remaining segmentlike sections of the springs are arranged with their center lines on a diameter, which in the case of a fixed spring, is smaller than the diameter of the addendum circle of the teeth of the sleeve support. Such a spring may serve as a stop in one as well as both shifting directions of the sliding sleeve. At the same time, it will effectively cooperate with a recess cutting the teeth of the sleeve carrier which recess depending on the shifting direction of the sliding sleeve and in its neutral position, is arranged either laterally in relation to the spring and runs out conically in the direction of the spring or has a cylindrical base and extends on both sides of the spring.

Whenever the sliding sleeve is to shift only in one direction, it has turned out to be particularly advantageous to use a spring which has a circular shape with open ends and which has in the fixed state an inside diameter which is smaller than the diameter of the dedendum of the teeth of the sliding sleeve. In this case, it will suffice in order to create a stop surface for the spring, to develop the teeth of the sleeve carrier or clutch gear on one side with equal ends projecting radially, the outside diameter of which lies between the inside diameter of the spring and the diameter of the dedendum circle of the toothing of the sliding sleeve.

Further objects of the invention will be apparent from the following description when considered in connection with the accompanying drawing in which;

FIG. 1 is a cross section showing a speed shifting and synchronization arrangement with a sliding sleeve for only one shifting direction in its unshifted position, FIG. 2 is a cross section showing the parts of FIG. 1 in a shifted position of the sliding sleeve, FIG. 3 is a side view of a spring serving as a stop ring, FIG. 4 is a partial section of a sliding sleeve for two shifting directions in a nonshifted position, and FIG. 5 is a partial section of a sliding sleeve for only one shifting direction in an unshifted position.

In FIG. 1, the numeral 1 designates a sliding sleeve shiftable axially on a clutch gear 5 and having internal teeth 2 in axially slidable intermeshing relationship with the external teeth or splines 3 of a clutch gear 5 which is fixed on a shaft 4 of the motor vehicle-synchronizing gear unit. The hub of the clutch gear 5 has been prolonged on one side in the form of a casing in order to incorporate a gear 6 which has been mounted freely rotatable. Gear 6 is smaller than the diameter of the addendum circle of the teeth 2 of the sliding sleeve 1 and with its mating gear 7 it represents a speed of the synchronizing gear unit. On a special part or sleeve 8, connected fixedly with a gear 6, coupling teeth 9 have been provided for the purpose of engaging with the teeth 2 of the sliding sleeve 1 after a synchronization has been achieved between the parts that are to be coupled by means of an interposed synchronizing ring 10.

The set of teeth 2 of the sliding sleeve 1, has an annular groove 11 therein, which is deep enough so that therein, segmentlike sections 12 of the annular spring 14, FIG. 3, are provided at the periphery with radial bulges 13, and ends 13a, can be pressed so that they will be rounded through the teeth 3 of the clutch gear 5. The spring 14 is intended to relax with its sections 12 in a recess 15 of the clutch gear 5 in the case of a shifting of the sliding sleeve 1 and then to strike there against the ends 16 of the teeth 3 projecting in relation to the sections 12 and as a result thereof, to limit the shifting path of the sliding sleeve 1, FIG. 2. For this purpose the recess 15 has a perpendicular flank 17 in relation to the shaft 4 and a generally conical cam surface 18.

FIG. 4 shows the sliding sleeve 1 provided for the selective coupling of two gears. In order to here limit the shifting path of the sliding sleeve 1 in both shifting directions, the recess 15a in the set of teeth 3 of the clutch gear 5 has been developed cylindrically. The ends 16 and 16a of the set of teeth 3 projecting in relation to the sections 12 of the spring 14, are limited in this case also by flanks 17 and 17a which are perpendicular in relation to the shaft 1.

The sliding sleeve 1 shown in FIG. 5 shifts only in one direction. In deviation from FIG. 1, the spring 14a in this case has been developed circularly so that it always rests with its entire periphery on the bottom of he annular groove 11a. This annular groove 11a is so deep that spring 14a will project with its thickness beyond the dedendum circle of the set of teeth 2 of the sliding sleeve 1, for the greatest part projecting into the depth of its teeth. The ends 16b of the set of teeth 3 of the clutch gear 5, project in the shape of a wreath on one side and they serve with one flank 17b which is perpendicular in relation to shaft 1, as a stop for the spring 14a.

The spring 14 or 14a can have both a circular as well as a square shape as to its cross section. The latter form has a larger stop surface.

We claim:

1. In a motor vehicle a gear-shifting and synchronizing mechanism of the class in which an internally toothed sliding sleeve is disposed for axial-shifting movement on an externally toothed clutch gear, into and from intermeshing engagement with an axially adjacent externally toothed gear, said mechanism including a circular spring arranged in an annular groove within said sliding sleeve and extending circumferentially across the internal teeth thereof, and stop means on said clutch gear for engagement with said spring to limit the axial shifting of said sliding sleeve; the improvement wherein he bottom of said groove is of greater diameter than the dedendum circle of said internal teeth, the entire external periphery of said spring engaging the bottom of said groove at all times, the diameter of the inner periphery of said spring being less than that of the dedendum circle of said internal teeth, the external teeth of said clutch gear adjacent one axial end thereof being encircled by said spring and having radial projections defining said stop means for axial engagement by said spring, the outer ends of said projections lying on a circle, the diameter of which is greater than the internal diameter of said spring, but less than the diameter of the dedendum circle of said internal teeth of the sliding sleeve.